(12) United States Patent
Dutta

(10) Patent No.: US 6,748,449 B1
(45) Date of Patent: Jun. 8, 2004

(54) CREATING AN OPINION ORIENTED WEB PAGE WITH HYPERLINKED OPINIONS

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 09/607,171

(22) Filed: Jun. 29, 2000

(51) Int. Cl.⁷ .............................. G06F 15/16
(52) U.S. Cl. .................. 709/245; 709/201; 709/206; 709/217; 709/229; 709/231; 709/246; 707/10; 707/104.1; 705/10
(58) Field of Search ................. 709/200–203, 709/206–207, 217–219, 229, 231, 245–246; 705/10, 14; 707/100–102, 104.1, 10; 715/501.1, 513

(56) References Cited

U.S. PATENT DOCUMENTS

| | | | |
|---|---|---|---|
| 5,530,852 A | * 6/1996 | Meske, Jr. et al. | 709/206 |
| 5,572,643 A | * 11/1996 | Judson | 709/218 |
| 5,796,948 A | 8/1998 | Cohen | 709/206 |
| 5,802,299 A | * 9/1998 | Logan et al. | 709/218 |
| 5,881,131 A | 3/1999 | Farris et al. | 370/259 |
| 5,983,267 A | * 11/1999 | Shklar et al. | 709/217 |
| 6,154,771 A | * 11/2000 | Rangan et al. | 709/217 |
| 6,253,239 B1 | * 6/2001 | Shklar et al. | 709/217 |
| 6,256,631 B1 | * 7/2001 | Malcolm | 707/10 |
| 6,434,567 B1 | * 8/2002 | De La Huerga | 707/102 |
| 6,529,878 B2 | * 3/2003 | De Rafael et al. | 705/14 |

OTHER PUBLICATIONS

Tutorial 14: You've Been Framed, Part 1. webreference.com/html/tutorial14/5.html, Jun. 30, 1999.
Naming a Frame, 1995.swl.offis.uni-oldenburg.de/handbuch/oldoku/ospace/webusr/frames.4html.
"Online Services—Could You Be Found Liable?—Defamation lawsuits raise troubling issues for providers and users of online info and services", Richard Raysman and Jeffrey D. Neuburger, Information Week Issue 546, p. 140, Sep. 19, 1995.

* cited by examiner

Primary Examiner—Bharat Barot
(74) Attorney, Agent, or Firm—Marilyn Smith Dawkins

(57) ABSTRACT

A system, method, and program enables an aggregation of opinions at a Web site by aggregating a separate hyperlink to each opinion instead of aggregating the content of the opinions. The content of each opinion remains resident at each opinion writer's Web site. Upon a request for the opinions oriented Web site, a Web page is sent to the requester which contains a description of the subject matter of the opinions, a list of at least one selectable hyperlink to an opinion at a different address site, and an input field for entering a hyperlink to an opinion. If a hyperlink is entered, the opinions oriented Web site generates a hyperlink in the Web page to the opinion. In a subsequent request for the Web page, the entered hyperlink is shown within the list of selectable hyperlinks.

6 Claims, 7 Drawing Sheets

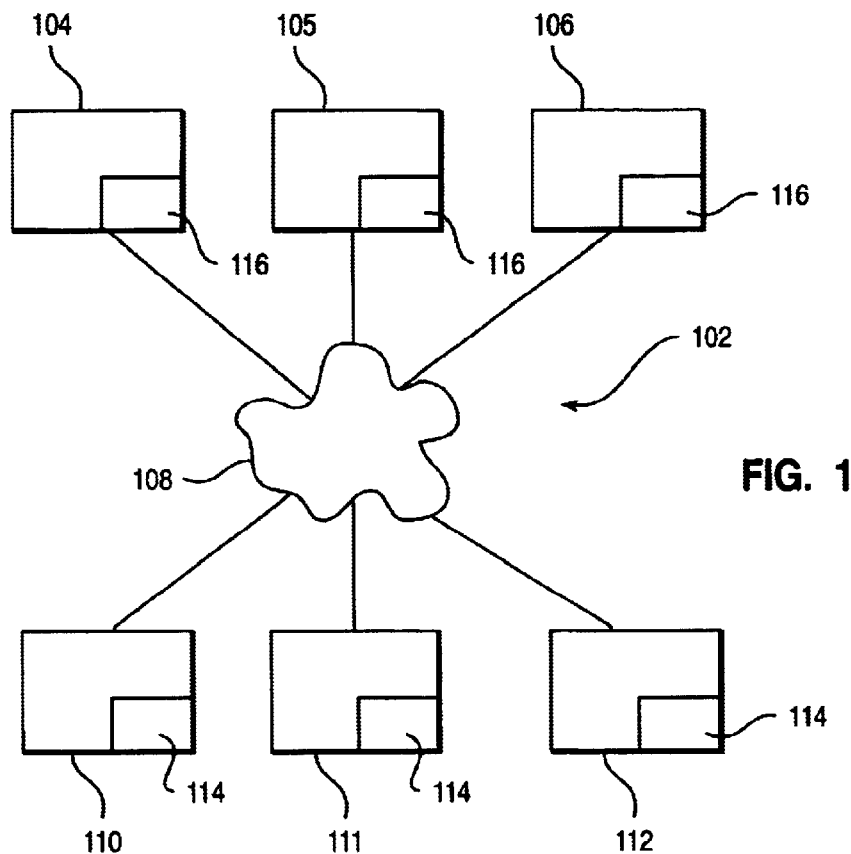
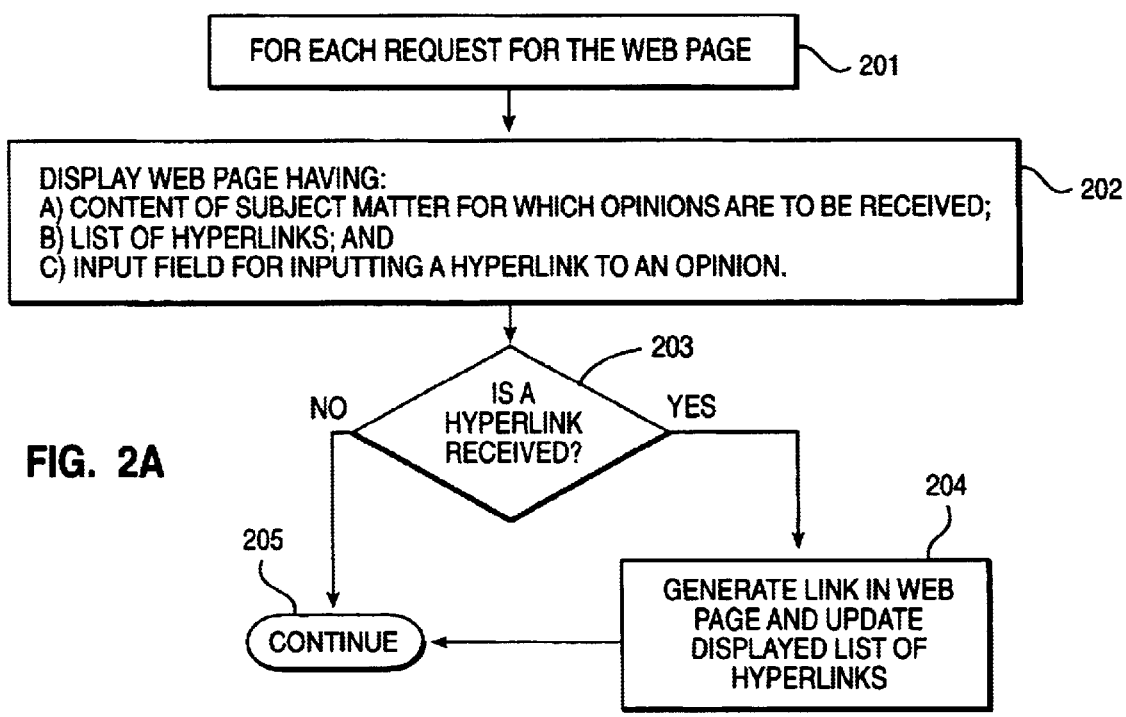
FIG. 1
FIG. 2A

CREATING AN OPINION ORIENTED WEB PAGE WITH HYPERLINKED OPINIONS

BACKGROUND OF THE INVENTION

1. Field of the Invention

This invention relates to discussion groups and other Web sites that accumulate opinions, and more specifically to a system, method and program for limiting the potential liability of a Web site owner accumulating opinions by posting only the links to the opinions wherein the content of each opinion remains at the opinion writer's Web site.

2. Description of the Related Art

As computational devices continue to proliferate throughout the world, there also continues to be an increase in the use of networks connecting these devices. Computational devices include large mainframe computers, workstations, personal computers, laptops and other portable devices including wireless telephones, personal digital assistants, automobile-based computers, etc. Such portable computational devices are also referred to as "pervasive" devices. The term "computer" or "computational device", as used herein, may refer to any of such device which contains a processor and some type of memory. The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

A widely used network is the Internet. The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

Web sites that are oriented towards collecting opinions are proliferating. Such sites include discussion groups, bulletin boards, and other Web sites that collect opinions. For example, the Web site "eopinions.com" collects opinions on products. In the past, Usenet groups were well known for free expression of opinions.

Currently, there have been several defamation lawsuits based on Web site content. Some cases have involved a teacher suing a student for defamation. It should be noted that in the prior art opinion oriented Web sites, an opinion writer may be unable to remove the opinion from the Web site since the Web site is controlled by the publisher of the site and not the writer of the opinion. Because of the control a publisher has over the Web site, some suits have also included the publisher of the Web site which published the comments. As such, the student as well as the content aggregator may be sued.

There is little disagreement on the fact that the writer can be sued for writing defamatory remarks. The question will continue to be litigated on the extent of liability of the Web site publisher. For example, should a Web publisher be held liable in a similar fashion as holding the typical print newspapers or book publishers liable when they publish defamatory remarks from others? If so, then it will be difficult to have controversial opinions oriented Web sites that solicit comments on products, or other subject matter, and allow them to be published with no reviews. This would essentially be similar to operating like an unmoderated Usenet newsgroup.

It would therefore be desirable to reduce the legal liability of a Web publisher who aggregates, in a Web site, opinions of individuals located worldwide.

SUMMARY OF THE INVENTION

It is therefore an object of the invention to minimize, if not eliminate, any potential liability of a Web publisher that accumulates opinions from others in the publisher's Web site.

It is a further object of the invention to isolate the content of opinions from the actual opinions oriented Web site of a Web publisher.

The system, method, and program of the invention enables a publisher's opinions oriented Web site to contain hyperlinks to the actual content of each opinion at the Web sites of each opinion writer. In this way, the Web site of the publisher does not contain any of the actual content of any of the opinions. It merely contains hyperlinks to the various opinions. The content of each opinion resides solely at the opinion writer's Web site. Likewise, any liability for the content should rest solely on the writer.

In one embodiment which more greatly ensures that the publisher's liability is minimized since no content is visually associated with the publisher's Web site, the opinion oriented Web site merely contains the hyperlink to the writer's opinion at another Web site that is not associated with, i.e., independent of, the publisher's Web site. In another embodiment, which enhances a user's ease of use of the opinion oriented Web site, the opinions oriented Web site contains a framed hyperlink to the writer's Web site. As such, in one frame of the user's browser, the browser displays a view of the publisher's Web site with selectable hyperlinks. In another frame of the user's browser, the content of a selected hyperlink from the other frame is displayed. Although the content physically resides at a location independent of, or separate from, the publisher's Web site, the appearance on the user's displayed browser indicates a visual association between the publisher's Web site and the content of the writer's opinion.

When an individual wishes to add an opinion to a Web site discussion group or other opinion oriented Web site, the individual provides the address, e.g., the URL, of a Web page at the individual's Web site where the individual has written the opinion. The opinion writer provides the URL instead of providing the content of the opinion.

Consequently, the liability of the publisher of the opinion oriented Web site should be minimized, if not eliminated, since the content physically resides on the computer of the person expressing the opinion, and not on the computer of the publisher of the opinion oriented Web site.

Each party involved realizes advantages with respect to the present invention. The opinion writer receives the advantage of having more visits to the writer's Web site. The opinion writer can also more easily remove or change the defamatory remarks in the opinion. This is especially helpful if the opinion writer fears a defamation lawsuit by the person being defamed. The publisher has the advantage of minimizing any liability in association with the writer's opinion by just pointing to the opinion at the writer's Web site instead of actually republishing it. The entity being defamed by an opinion realizes an advantage in that the entity knows whom to contact under such circumstances.

BRIEF DESCRIPTION OF THE DRAWINGS

For a more complete understanding of the present invention and the advantages thereof, reference should be made to the following Detailed Description taken in connection with the accompanying drawings in which:

FIG. 1 illustrates a high-level block diagram of a data processing system network in which a preferred embodiment of the present invention may be implemented;

FIG. 2A is a flow chart of the process and program function carried out at a publisher's Web site enabling receipt of a hyperlink to an opinion writer's opinions, and generating a link in the publisher's Web page to the opinion writer's opinion;

DETAILED DESCRIPTION OF THE PREFERRED EMBODIMENTS

Figure 2B:
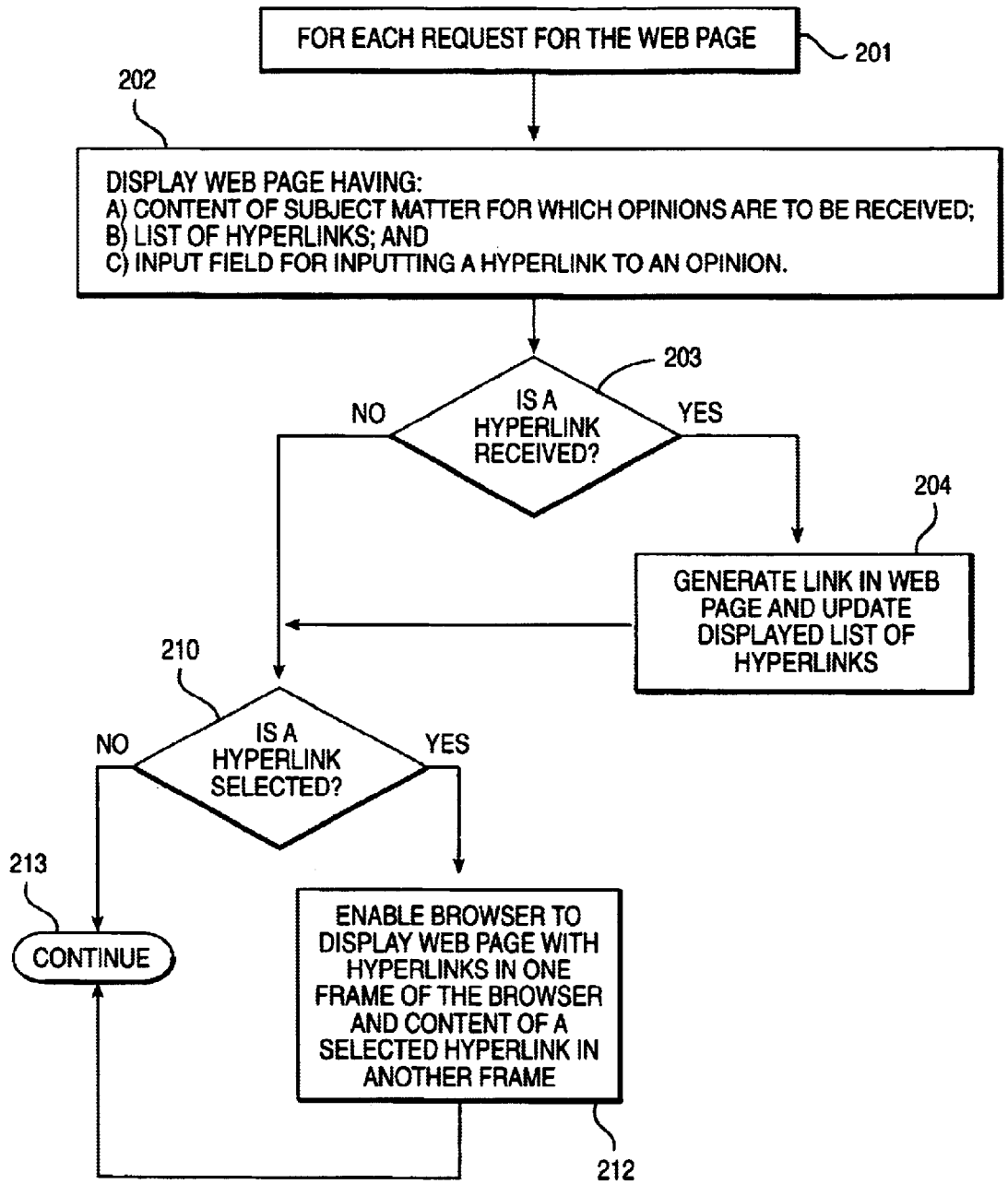
FIG. 2B is a flow chart of the process and program function carried out at a publisher's Web site as shown in FIG. 2A with the further step and program function of enabling a client browser to display a selected hyperlink in one frame of the browser and the content of the selected hyperlink in another frame of the browser.

In the following description, reference is made to the accompanying drawings which form a part hereof, and which illustrate several embodiments of the present invention. It is understood that other embodiments may be utilized and structural and operational changes may be made without departing from the scope of the present invention.

With reference now to the figures, and in particular with reference to FIG. 1, a high-level block diagram of a data processing system network in which a preferred embodiment of the present invention may be implemented is depicted. Data processing system network 102 includes one or more servers 104–106 which are accessible as part of the Internet 108 or other network. Data processing system network 102 also includes one or more clients, e.g., data processing systems 110–112, which may access servers 104–106. The content may be accessed using any of a variety of messaging system protocols including Hypertext Transfer Protocol (HTTP), File Transfer Protocol (FTP), Network News Transfer Protocol (NNTP), Internet Mail Access Protocol (IMAP) or Post Office Protocol (POP).

In accordance with the present invention, a client within data processing system network 102, such as client 112, includes a messaging system client application 114 (e.g., a browser) capable of transmitting and receiving messages to and from a messaging system server application 116 within a server, such as server 106, within data processing system network 102. More specifically, server 106 contains Hypertext Markup Language (HTML) Web pages oriented towards the aggregation of opinions from others. Communications between data processing system 112 and server 106 occur over the Internet 108 and conform to the Hypertext Transfer Protocol (HTTP) in accordance with the known art. In the present invention, data processing system 112 is employed by an opinion writer while data processing system 110 is employed by a user looking for the opinions of others as aggregated by a publisher operated server 106. It should be recognized that the opinion writer and user could both use the same system 112, or even be the same entity.

FIG. 2A is a flow chart of the process and program function carried out at a publisher's Web site enabling receipt of a hyperlink to an opinion writer's opinions, and generating a link in the publisher's Web page to the opinion writer's opinion. For each request by a client for the publisher's Web page, 201, the publisher's Web page is sent to the requesting client. The publisher's Web page contains the following: a) a description of the subject matter for which the opinions are to be received; b) a list of previously received hyperlinks, if any; c) and an input field for inserting a hyperlink to the content of an opinion, 202. If a link is inserted into the input field, 203, then the publisher's server generates a hyperlink within the publisher's Web page and updates the list of hyperlinks, 204. It should be noted that although a link has been inserted into the input field and received by the publisher, the publisher may decide not to generate a link in the Web page to the opinion. For example, for highly controversial or defamatory opinions, the publisher may opt not to include it. As such, before generating the link, the publisher may include the steps of accessing the link and making a determination as to whether to include the link in the Web page or not.

Figure 3A:
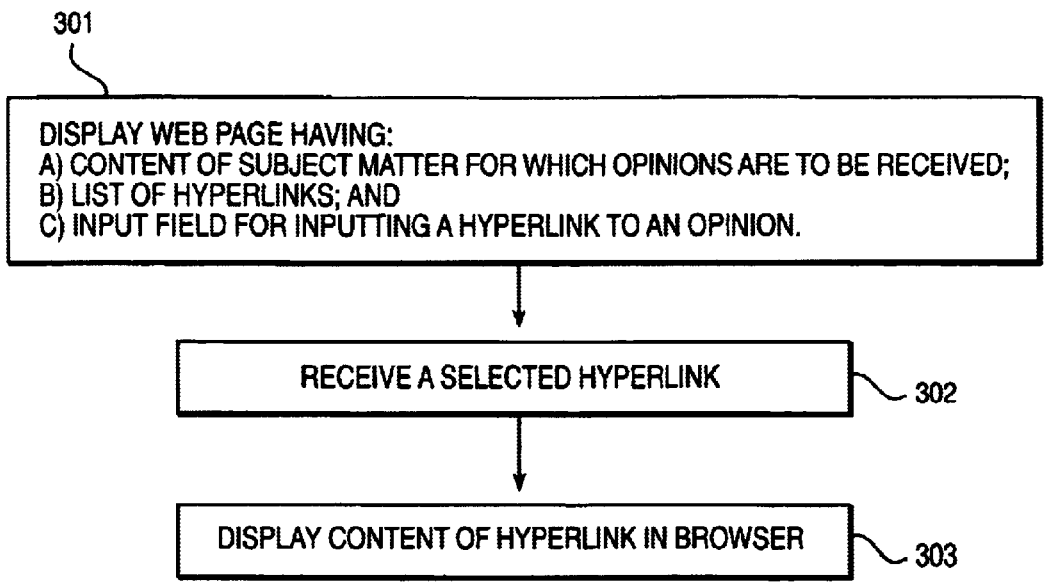
FIG. 3A is a flow chart of the process and program function carried out by a client browser in which an opinions oriented Web page having subject matter and aggregated hyperlinks are displayed.
Figure 3B:
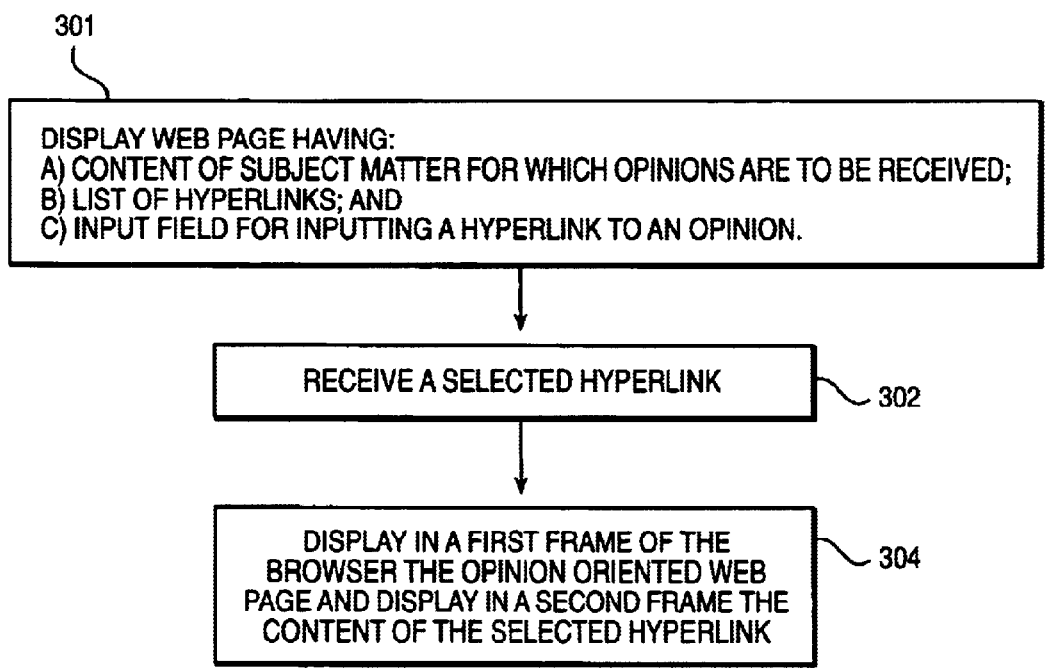
FIG. 3B is a flow chart of the process and program function carried out by a client browser shown in FIG. 3A further including the step and program function of displaying in a first frame of the client browser the opinions oriented Web site with the aggregated hyperlinks, and displaying in a second frame of the client browser the content of a selected hyperlink from the first frame.

If a hyperlink is not received, 203, then processing continues, 205, such as by waiting for a hyperlink to be received or by further processing as shown in FIGS. 3A or 3B, or through normal processing such as ending a session with the current client, etc. Likewise, processing continues 205 after the links are generated, 204.

FIG. 2B is a flow chart of the process and program function carried out at a publisher's Web site as shown in FIG. 2A including steps 201, 202, 203, 204. In one embodiment as shown in FIG. 2B, processing continues to determine if a hyperlink is selected from the displayed list, 210. If it is, then the server enables the client browser to display the Web page with the list of hyperlinks in one frame of the client browser, and the content of the selected hyperlink in another frame of the client browser, 212. Frames are further described at the following sites which are herein incorporated by reference:

> www-sw1.offis.uni-oldenburg.de/handbuch/oldoku/
> ospace/web usr/frames.4.html
> www.webreference.com/html/tutorial14/5.html Processing then continues 213 outside the scope of this invention but in accordance with typical processing by servers in communication with clients.

FIG. 3A is a flow chart of the process and program function carried out by a client browser in which an opinions oriented Web page having subject matter and aggregated hyperlinks are displayed. Upon receipt from a server, the client browser displays an opinions oriented Web page having a description of the subject matter, a list of aggregated hyperlinks, and an input field for adding a link, 301. Upon selection by a user of a displayed hyperlink 302, the browser displays the content of the hyperlink, 303.

FIG. 3B is a flow chart of the process and program function carried out by a client browser shown in FIG. 3A 1including steps 301 and 302 as described above. Furthermore, upon selection by a user of a displayed hyperlink, the browser displays the content of the hyperlink in one frame within the browser while the browser continues to display the publisher's Web page showing the list of selectable hyperlinks in another frame, 304.

Figure 4A:
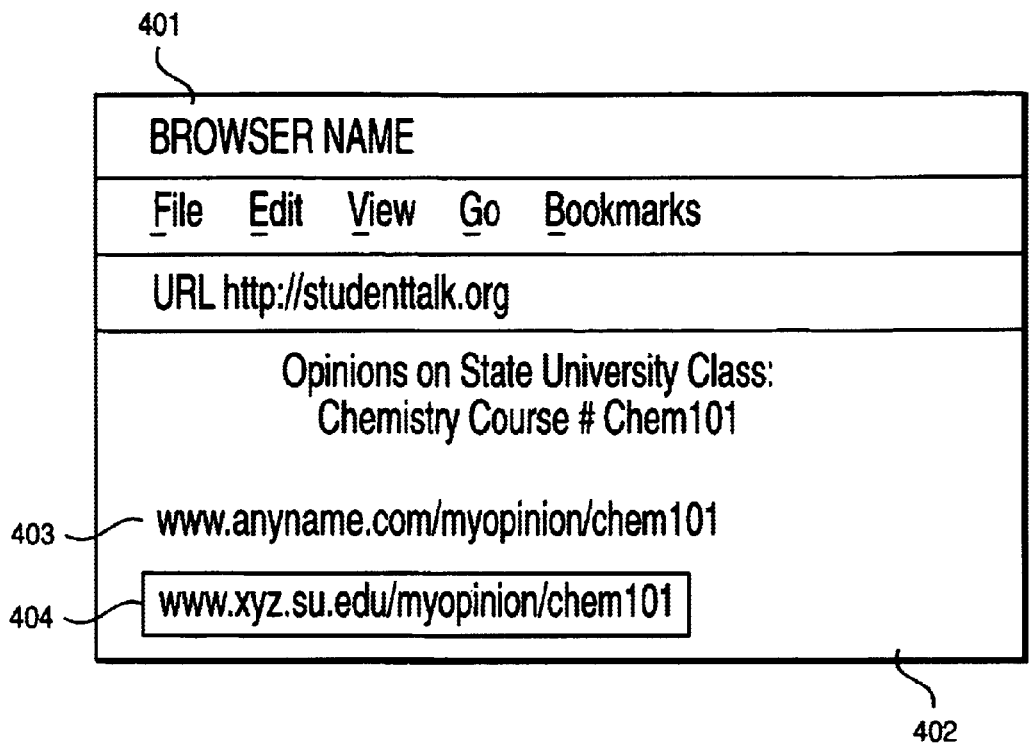
FIG. 4A illustrates a sample client browser displaying a publisher's opinions oriented Web page with a list of selectable hyperlinks.

FIG. 4A illustrates a sample client browser 401 displaying a publisher's opinions oriented Web page 402 with a list of selectable hyperlinks 403, 404. The publisher's opinions oriented Web page and the hyperlinks are shown for illustrative purposes only. They are purely fictional and any resemblance to actual Web pages or URL addresses is unintentional.

Figure 4B:
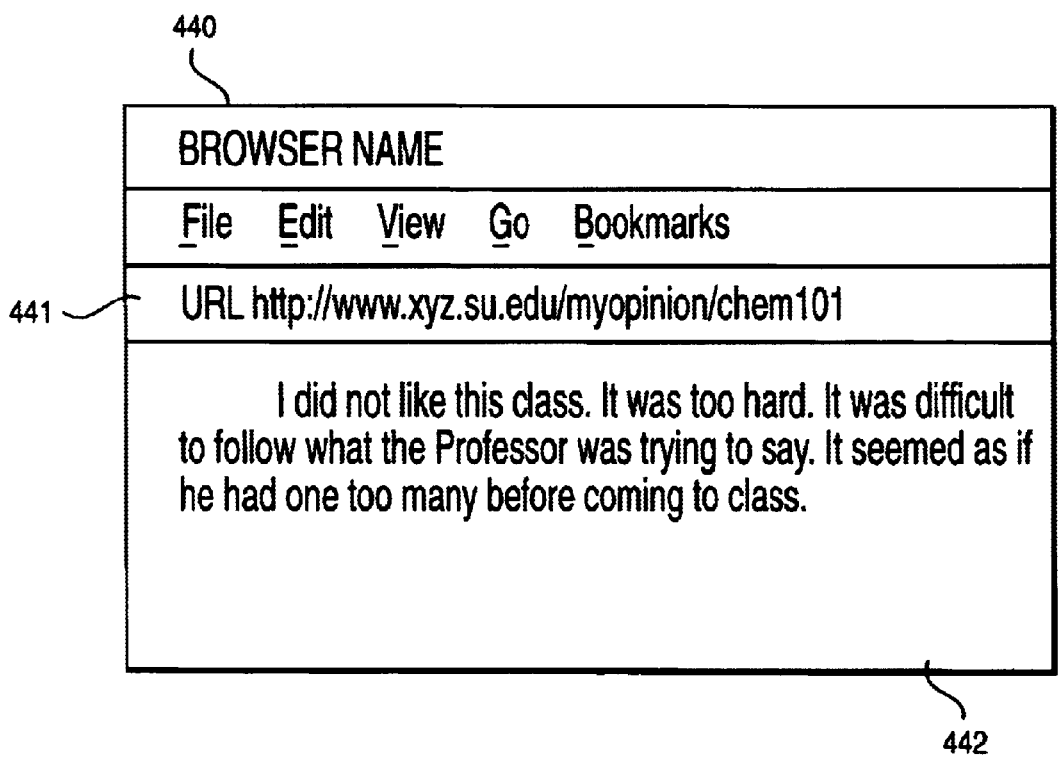
FIG. 4B illustrates a sample client browser displaying the content of an opinion writer at a link selected from the publisher's Web page shown in FIG. 4A.

FIG. 4B illustrates a sample client browser 440 displaying the content 442 of an opinion writer at a link 441 selected from the publisher's Web page shown in FIG. 4A as hyperlink 404.

Figure 5:
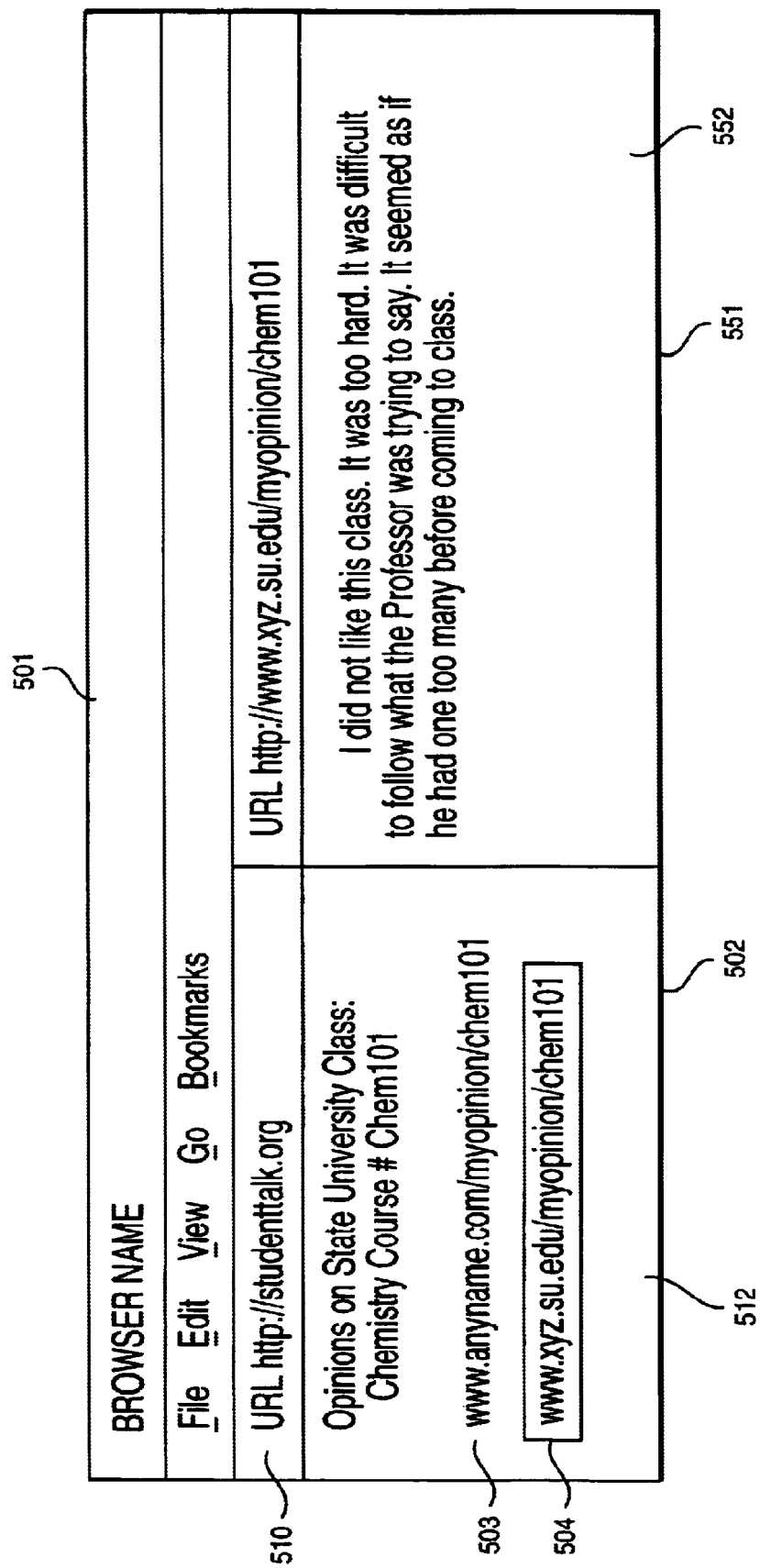
FIG. 5 illustrates a sample client browser displaying a publisher's opinions oriented Web page with a list of selectable hyperlinks in a first frame of the browser and the content of an opinion writer in a second frame of the browser.

FIG. 5 illustrates a sample client browser 501 displaying a publisher's opinions oriented Web page 512 having a URL address 510 with a list of selectable hyperlinks 503, 504 in a first frame 502 of the browser, and the content 552 of an opinion writer in a second frame 551 of the browser.

Figure 6A:
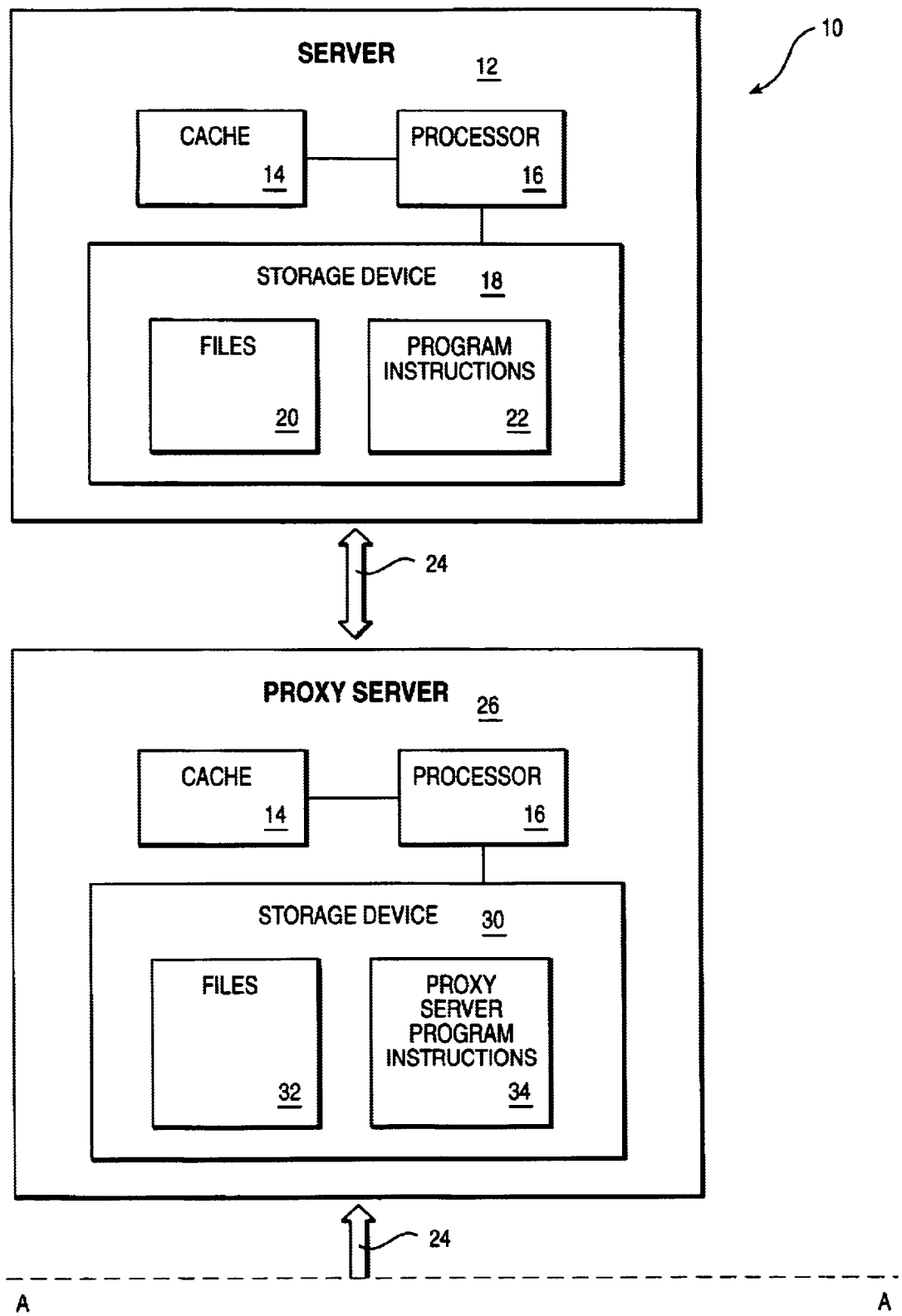
FIG. 6 is a block diagram of computational devices in a client/server network such as the Internet.
Figure 6B:
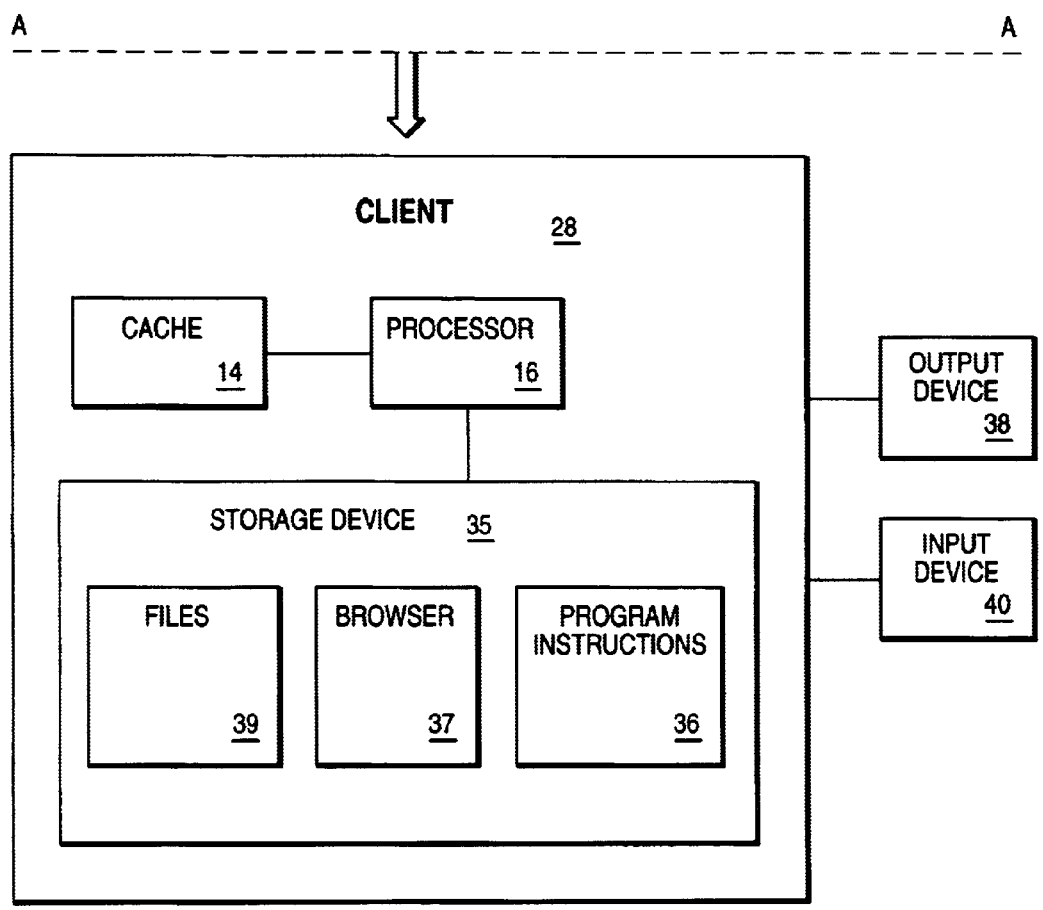

FIG. 6illustrates an embodiment of a system 10 for transferring information within a client/server network. System 10 includes computational devices used as a network server, a proxy and a client. A computational device may be, but is not limited to, a personal computer, laptop, workstation, mainframe or hand held computer including palmtops, personal digital assistants, smart phones, and/or cellular phones. In the embodiment of FIG. 6, server 12 includes cache 14, processor 16 and storage device 18. Cache 14 is a collection of storage locations which are rapidly accessible by processor 16. In an embodiment, cache 14 may be a portion of the processor's system memory allocated for temporary storage. Storage device, or storage medium, 18 may take many forms, such as volatile and/or nonvolatile memory or any combination thereof. Volatile memory may be any suitable volatile memory device, e.g., RAM, DRAM, SRAM. Nonvolatile memory may include storage space, e.g., via the use of hard disk drives or tapes. Some example storage mediums include a magnetic disk, a hard drive or floppy drive, an optical disk, and/or magnetic tape. Such a storage device is sometimes referred to as a "direct access storage device" (DASD). Typically, storage device 18 has a larger storage capacity than cache 14, but takes longer for processor 16 to access.

In the embodiment of FIG. 6, storage device 18 includes files 20 and program instructions 22, also referred to as program executables. The program instructions are typically stored as "executable files" in a storage device and loaded into memory during execution. Files 20 may include documents such as Web pages suitable for viewing by a user of the network, and may contain text, graphics, video and/or audio information. Such document files may be in the HTML language, or in other suitable languages such as Extensible Markup Language (XML) or Wireless Markup Language (WML). Files 20 may further include data files suitable for use by computational devices in communicating across the network. "Files" as used herein may refer to any collection of data suitable for storing on a computational device or transferring within a network. Program instructions 22 may include various program instructions used to implement functions of network server 12, such as program instruction used to implement the methods described herein.

Transmission medium 24 may be used to connect network server 12 to other computational devices, such as proxy server 26 and/or client 28. Transmission medium 24 may include, for example, a wire, cable, wireless transmission path, or a combination of these. Protocols used for transmission medium 24 may include TCP/IP, HTTP, and/or other suitable protocols such as Wireless Applications Protocol (WAP).

System 10 may include client 28, linked to server 12 using transmission medium 24. In the embodiment of FIG. 7, client 28 includes cache 14, processor 16, and storage device 35. Storage device 35 is similar to storage device 18 described above, and may include files 39, a browser program 37 and program instructions 36. Program instructions can include operating system program instructions and application program instructions. Although a browser program such as browser 37 is implemented using program instructions (or executables) such as instructions 36, browser 37 is shown separately in FIG. 6 to emphasize this feature of the client. Browser program 37 may be, for example, a Web browser which allows a user to retrieve and view files on the World Wide Web (WWW), or a program which performs a similar function on some other network. In some embodiments, client functions involved in implementation of the methods described herein are included in browser 37. Such functions, and/or other functions of the client computing device, may also be implemented in separate program instructions such as program instructions 36. Files 39 may include various files stored on the client computational device, including files downloaded from a network server such as server 12. Client 28 is typically associated with an output device 38 and input device 40, particularly in embodiments for which the client computational device is operated by a user of the system 10. Output device 38 may include, for example, a display screen and/or a printer. Input device 40 may include, for example, a keyboard, voice input system, touch sensitive device, and/or a pointing device such as a mouse, track ball, light pen, pen-stylus, and/or any other input means.

In some embodiments, system 10 may also include a proxy server 26. A proxy server as used herein refers to a computational device which acts as an intermediary between a client and a "real" server. The proxy server may appear as a server to the client, and as a client to the real server. Requests from the client may be responded to by the proxy server, or passed on to the real server. Files or other communications from the real server may be passed on to the client by the proxy server. A proxy server may be employed in system 10 for various reasons. For example, proxy servers may be used to provide specialized content and/or improved performance to a selected group of client computers. An example of this may be the use of caching by proxy servers to increase the speed of providing some files to subscribers to a particular Internet Service Provider (ISP). Another use of a proxy server may be to filter the information being sent from the client to a real server, and/or from the real server to the client. In the embodiment of FIG. 6, proxy server 26 includes cache 14, processor 16, and storage device 30. Storage device 30 may include files 32 and proxy server program instructions 34. Files 32 may include any files stored on the proxy server, such as files being transmitted between a server and a client. Program instructions 34 may include various program instructions used to implement functions of proxy server 26, such as interacting with client computers.

In FIG. 6 and in any other block diagrams appearing herein, the blocks are intended to represent functionality rather than specific structure. Implementation of the represented system using circuitry and/or software could involve a combination of multiple blocks into a single circuit or device, or a combination of multiple circuits and/or devices to realize the function of a block. For example, cache 14 may be included on a semiconductor chip embodying processor 16. Furthermore, a system such as system 10 may include other elements not explicitly shown. For example, multiple servers, proxy servers, and/or clients not shown in FIG. 6 may be included in a system used for implementing the methods and functions described herein. Further, the server, proxy server, and/or client computational devices may themselves include additional elements not shown.

The exemplary embodiment shown in FIG. 6 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMs) or erasable, electrically programmable read only memories (EEPROMs), recordable type mediums such as floppy disks, hard disk drives and CD-RW and DVD-RW disks, and transmission type mediums such as digital and analog communication links, or any signal bearing media.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by letters patent is set forth in the following claims:

What is claimed is:

1. A method for enabling an opinions oriented Web page at a first Web site in an network environment, comprising:

receiving a request for the Web page by a requester; and sending to the requester a Web page having i) a description of subject matter for which opinions are to be received, ii) a list of previously received hyperlinked opinions, and iii) an input field for receiving a link to an opinion wherein the link refers to an address apart from an address of the first site; and upon receipt of the link, generating the link in the list thereby creating an updated list in the Web page wherein the updated list is provided when the Web cage is subsequently requested.

2. The method of claim 1 further comprising determining whether to generate the link in the list by accessing the link to the opinion to determine acceptability of the opinion by a Web page owner.

3. The method of claim 1 further comprising displaying the Web page and the list in a first frame and content of an opinion from a selected hyperlink from the list in a second frame.

4. A system having means for aggregating opinions at a network accessible first site, comprising:

means for receiving a request for the Web page by a requester; and means for sending to the requester a Web page having i) a description of subject matter for which opinions are to be received, ii) a list of previously received hyperlinked opinions, and iii) an input field for receiving a link to an opinion wherein the link refers to an address apart from an address of the first site; and means for generating, upon receipt of the link, the link in the list thereby creating an updated list in the Web page wherein the updated list is provided when the Web page is subsequently requested.

5. The system of claim 4 further comprising means for determining whether to generate the link in the list by accessing the link to the opinion to determine acceptability of the opinion by a Web page owner.

6. A program, having computer readable program code means on a computer usable medium, comprising:

means for receiving a request for a Web page at a first network accessible site by a requester; and means for sending to the requester the Web page having i) a description of subject matter for which opinions are to be received, ii) a list of previously received hyperlinked opinions, and iii) an input field for receiving a link to an opinion wherein the link refers to an address apart from an address of the first site; and means for generating, upon receipt of the link, the link in the list thereby creating an updated list in the Web page wherein the undated list is provided when the Web page is subsequently requested.

* * * * *